United States Patent

Sherwood

[15] 3,649,112
[45] Mar. 14, 1972

[54] CAMERA EXPOSURE CONTROL

[72] Inventor: William T. Sherwood, Rochester, N.Y.

[73] Assignee: Eastman Kodak Company, Rochester, N.Y.

[22] Filed: Sept. 4, 1970

[21] Appl. No.: 69,858

[52] U.S. Cl. ..............................352/141, 95/10 C, 352/204
[51] Int. Cl. ......................................................G03b 19/18
[58] Field of Search ..........................352/141, 204, 207, 208; 95/10 C

[56] References Cited

FOREIGN PATENTS OR APPLICATIONS

| 243,088 | 10/1965 | Austria | 352/141 |
| 268,882 | 2/1969 | Austria | 352/141 |
| 1,065,811 | 4/1967 | Great Britain | 352/141 |
| 233,392 | 5/1964 | Austria | 352/141 |
| 423,463 | 4/1967 | Switzerland | 352/141 |
| 438,014 | 11/1967 | Switzerland | 352/141 |

Primary Examiner—Joseph F. Peters, Jr.
Attorney—R. W. Hampton and Milton S. Sales

[57] ABSTRACT

A motion picture camera includes a rotating shutter having a mirror surface for folding the light path while the shutter is closed to direct light to a photosensitive surface on a photoresponsive member. In order to maximize the amount of light from the central area on the object which is directed to the photosensitive surface of the photoresponsive member and to minimize the amount of light from the peripheral areas of the object directed to the photosensitive surface, means are provided for moving the primary image plane in a direction further from the objective when the light is directed towards the photoresponsive member. This may be accomplished by forming the mirror reflecting surface with a convex shape.

6 Claims, 4 Drawing Figures

Patented March 14, 1972

3,649,112

WILLIAM T. SHERWOOD
INVENTOR.

BY Milton S. Sales
Robert W. Hampton

ATTORNEYS 3,649,112

CAMERA EXPOSURE CONTROL

BACKGROUND OF THE INVENTION

1. Field of the Invention

The present invention relates to cine cameras having automatic exposure control devices, and more particularly to an apparatus for such cameras for more effectively using scene light for regulation of such control devices.

2. Description of the Prior Art

Cine cameras having automatic exposure control are well known, as are those in which a photocell responsive to scene light is arranged within the camera and the scene light is projected onto the photocell by means of the camera lens system. Such an exposure control device automatically varies the exposure time and/or the size of the diaphragm opening as the film is advanced intermittently past the exposure station. As the shutter rotates, a light beam from the scene is cyclically directed to the photosensitive member for regulating the exposure control device. Some of the prior art include, as shown in co-assigned U.S. Pat. No. 3,188,935, a shutter member which is provided with a truncated reflective surface on the periphery of the shutter. The reflective surface is arranged at such an angle with respect to the light path so as to project scene light from the objective to a photosensitive member or photocell while the shutter is closed.

Various means have been employed in the past for restricting the acceptance angle of the photosensitive member to those areas of the scene most likely to contain the subject of interest. Such prior art means include spot meters, light baffles and, in the case of co-assigned U.S. Pat. No. 3,442,191, a gas bubble which floats in liquid. While these prior art means are effective to varying degrees, they require a relatively large area behind the lens, making them in some cases unsuitable for use in reflex exposure control systems for motion picture cameras.

SUMMARY OF THE INVENTION

It is an object of the present invention to provide an improved exposure control for a motion picture camera or the like wherein light reaching a photoresponsive member from a selected area of a scene is maximized and the amount of light reaching the photoresponsive member from other areas of the scene is minimized.

In accordance with the above object, a motion picture camera is provided with an objective having an optical axis and a rotatable shutter member including adjacent light transmitting and opaque portions disposed for cyclically interrupting scene light along the light path when the camera is operating. A surface mirror is positioned on the shutter for reflecting at least a portion of the scene light along a second axis to a photosensitive surface. The mirror surface has a convex cross section in a plane defined by the optical and second axes.

The invention, and its objects and advantages, will become more apparent in the detailed description of the preferred embodiments presented below.

BRIEF DESCRIPTION OF THE DRAWINGS

The above and other objects and advantages of the present invention will become apparent to one skilled in the art from the following detailed description read in conjunction with the attached drawings wherein like reference numerals indicate like elements and wherein.

DESCRIPTION OF THE PREFERRED EMBODIMENTS

Because cameras are well known, the present description will be directed in particular to elements forming part of, or cooperating more directly with apparatus in accordance with the present invention. It is to be understood that camera elements not specifically shown or described may take various forms well known to those skilled in the art.

Figure 2:
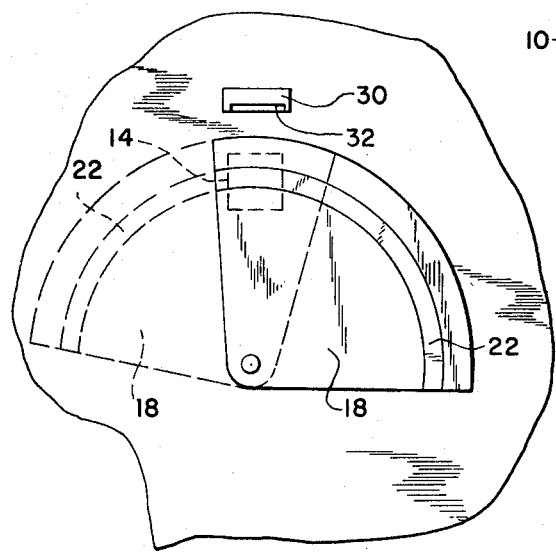
FIG. 2 is a front view of the shutter member and photoresponsive member of the camera portion shown in FIG. 1.
Figure 1:
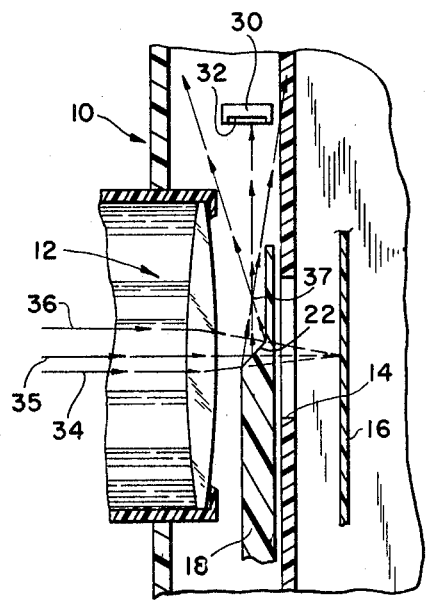
FIG. 1 is a vertical sectional view of a portion of a prior art motion picture camera having a shutter member and a photoresponsive member.

FIGS. 1 and 2 illustrate by way of example a movie camera according to the prior art. A camera housing 10 mounts a main objective 12. In line with the optical axis of objective 12 and further to the rear of the camera is a strip of film 16 which may be moved intermittently in a well known manner through the primary image plane of objective 12. A rotary semicircular shutter 18 supported by a shaft 20 is so arranged between objective 12 and an aperture 14 that during rotation it alternately covers and clears the aperture. Shutter 18 is provided with a conical reflecting mirror surface 22.

A variable aperture (not shown) is positioned across the path of light. The aperture is connected with a transducer (not shown) and is movable to adjust the amount of light transmitted to film 16 in response to an electrical signal generated by a photoresponsive member of photocell 30 which detects the intensity of illumination impinging upon photosensitive surface 32. Apparatus of the type so far described are well known in the art, and are disclosed in U.S. Pat. No. 3,176,312 in the name of Herbert Reinsch, for example.

When using lenses having relatively short focal lengths, for instance lenses having focal lengths of about 9 millimeters, the back focus of the lens is so short that there is room behind the lens only for a relatively thin shutter, the film pulldown mechanism and the necessary clearances. In order to incorporate a mirror within the space occupied by the shutter, the shutter has been made to contain the reflex mirror. However, in this design the height of the mirror would normally be reduced to the thickness of the shutter, thus limiting the amount of light reflected thereby and necessitating optimum use of that light which is reflected. In accordance with the present invention, it was found desirable to utilize means for maximizing the amount of light directed to the photoresponsive member from the area of the scene most likely to contain the feature of interest while at the same time minimizing the amount of light directed to the photoresponsive member from other areas of the scene.

With reference to FIG. 1, a shutter member 18 has a mirror surface 22 positioned at an angle of 45° to the optical axis to fold the light path of light rays along the optical axis at an angle of 90° to impinge upon photoresponsive member 30. As shown in FIG. 1, mirror surface 22 is flat in cross section. Objective 12 forms an image of a scene at infinity on a primary image plane spaced a predetermined distance from the objective. When the shutter is open, light rays 34, 35 and 36, which originate from a point object on axis at infinity, converge at a point on axis at the primary image plane a predetermined distance from objective 12. Rays 34 and 36 are the marginal rays which will be intercepted by mirror surface 22. Ray 35 is on the optical axis.

When the shutter is closed, the rays 34, 35 and 36 from the point object on axis are folded by mirror surface 22 so that they converge at a point 37 and begin diverging from that point. Point 37 is equal distance along ray 35 from the objective as is the film plane. Due to space requirements in the camera, surface 32 usually cannot be located near point 37. Therefore, as can be seen in FIG. 1, some of the rays diverging from the point object miss surface 32 of photoresponsive member 30. Of course, rays from other points on the object besides the on axis point will impinge upon the photoresponsive member. However, since the desired subject of most photography is on axis, it is desirable to have the exposure control system primarily responsive to lighting conditions closer to the center of the scene. Therefore, if more of the light rays from the point object (such as rays 34 and 36) were made to impinge upon surface 32 of photoresponsive member 30, and less of the rays from the peripheral area of the scene reached surface 32, the camera exposure system would be primarily responsive to the point in the scene where the desired subject is most likely to appear.

Figure 4:
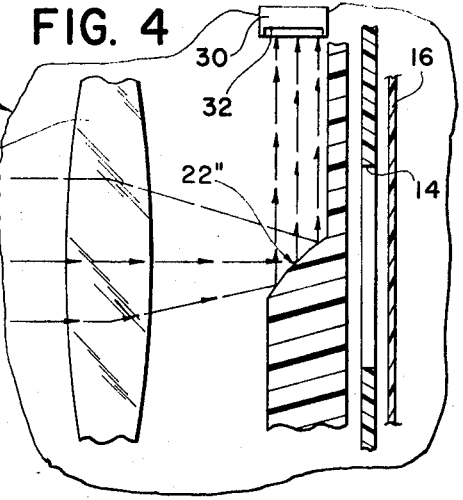
Figure 3:
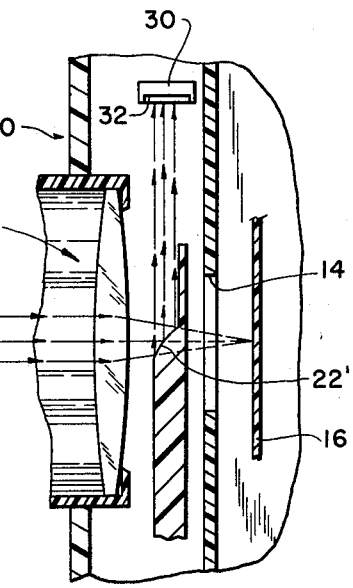
FIG. 3 is a vertical sectional view of a portion of a motion picture camera embodying the present invention; an FIG. 4 is a vertical sectional view of a modification of the present invention.

FIGS. 3 and 4 illustrate preferred embodiments of apparatus of this invention for maximizing the amount of light from the central area of the scene or object that impinges upon surface 32 of member 30 and also for minimizing the amount of light from peripheral areas of the scene that impinge upon surface 32. In FIG. 3, this is accomplished by providing on shutter 18 a convex reflective mirror surface 22' that is aligned with objective 12 when the shutter is closed. The curvature of convex surface 22' is selected so that a major portion of the rays from a point object in a scene along the camera optical axis will be reflected or folded by surface 22' to surface 32 as shown for rays 34, 35 and 36 in FIG. 3. At the same time, the convex shape of surface 22' tends to deflect away from surface 32 those rays emanating from peripheral areas of the object (i.e., away from the point on the optical axis) so that the number of such rays striking surface 32 is reduced with respect to the prior art. In FIG. 3, surface 22' has been shown having a curvature effective to move point 36 to infinity so that reflected rays 34, 35 and 36 are substantially parallel to each other.

FIG. 4 of the drawings illustrates another embodiment of the present invention which may be used (for example) in instances where the formation of a convex surface as shown at 22' in FIG. 3 is either inconvenient or difficult. In FIG. 4, the shutter has a reflective surface 22" comprising a plurality of separate, flat surfaces that jointly comprise a surface that is substantially convex in cross section similar to that shown at 22' in FIG. 3. Each of the individual surface portions in FIG. 4 are straight or flat when viewed along a plane taken through the optical axis of objective 12 and through the axis of rotation of shutter 18 when the shutter is closed. The number of rays from a point object in the central area of a scene on the optical axis reflected by the various portions of surface 22" onto surface 32 as shown in FIG. 4 are increased, while the number of other rays directed onto surface 32 by surface 22" are decreased. Surfaces 22' and 22" both preferably are curved from one side edge of the shutter to the other edge thereof as shown for surface 22 in FIG. 2 so that light rays can be reflected toward surface 32 any time shutter 18 is closed.

The invention has been described in detail with particular reference to preferred embodiments thereof, but it will be understood that variations and modifications can be effected within the spirit and scope of the invention.

I claim:

1. An exposure control for a camera having a objective for passing scene light along a first path to a primary image plane spaced a predetermined distance from the objective, the objective having an optical axis; said exposure control comprising:

light reflecting means for periodically folding the light path of at least a portion of the scene light along a second axis at an angle to the optical axis;

a photoresponsive member having a photosensitive surface positioned on said second axis along said folded light path a distance further than said predetermined distance; and means for reestablishing the primary image plane along said second axis at a distance from said objective greater than said predetermined distance, whereby the amount of light from a predetermined area of the object directed to said photosensitive surface is maximized and the amount of light from other areas of the object directed to the photosensitive surface is minimized.

2. An exposure control as defined in claim 1 wherein said light reflecting means comprises a mirror having reflecting surface having a convex cross section in a plane defined by said optical and second axes.

3. An exposure control as defined in claim 1 wherein said light reflecting means comprises a mirror having a series of surfaces having straight line cross sections in a plane defined by said optical and second axes, said straight lines approximating a convex curve.

4. For use with an objective for forming an image of an object substantially in a primary image plane, said objective having an optical axis, a photoelectric apparatus for detecting the intensity of illumination transmitted from the object through the objective, said photoelectric apparatus comprising:

a. a photoresponsive member having a photosensitive surface, said surface being disposed at a position off the optical axis of the objective; and b. a mirror having a convex reflecting surface disposed between the objective and the primary image plane for reflecting a portion of the light transmitted through the objective to the photosensitive surface, the curvature of the mirror being such that the amount of light from a predetermined area of the object directed to said photosensitive surface is maximized and the amount of light from other areas of the object directed to the photosensitive surface is minimized.

5. An exposure control for a camera having an objective for passing scene light along a first light path to a primary image plane spaced a first distance from the objective; said exposure control comprising:

a photoresponsive member off said first light path and having a photosensitive surface spaced a second distance from the objective, said second distance being greater than said first distance;

a shutter member movable along a path, said shutter member having separate light transmitting and opaque portions disposed with respect to each other and with respect to the objective for cyclically interrupting scene light along said first light path when the camera is operating; and light reflecting means on said opaque portion movable through the first light path for directing at least a portion of the scene light to said photosensitive surface along a second light path substantially perpendicular to said first light path, said light reflecting means (1) having at least one elongated reflective surface extending substantially along the direction of movement of said shutter member and (2) having means for reestablishing the primary image plane along said second axis at a distance from the objective greater than said first distance, whereby the amount of light from a first area of the object directed to said photosensitive surface is maximized and the amount of light from other areas of the object directed to the photosensitive surface is minimized.

6. An exposure control as defined in claim 5 wherein said means for reestablishing the primary image plane is said reflective surface which defines a convex cross section in a plane defined by said optical and second axes.

* * * * *